United States Patent [19]

Yamamoto

[11] Patent Number: 4,752,085
[45] Date of Patent: Jun. 21, 1988

[54] POWERED TILT STEERING ARRANGEMENT

[75] Inventor: Yoshimi Yamamoto, Kosai, Japan

[73] Assignee: Fuji Kiko Company, Limited, Tokyo, Japan

[21] Appl. No.: 919,228

[22] Filed: Oct. 16, 1986

[30] Foreign Application Priority Data

| Oct. 14, 1985 | [JP] | Japan | 60-228214 |
| Oct. 22, 1985 | [JP] | Japan | 60-235847 |
| Oct. 29, 1985 | [JP] | Japan | 60-242182 |
| Oct. 29, 1985 | [JP] | Japan | 60-165928[U] |

[51] Int. Cl.$^4$ .............................................. B62D 01/18
[52] U.S. Cl. ........................................ 280/775; 74/493
[58] Field of Search .......................... 280/775; 74/493

[56] References Cited

U.S. PATENT DOCUMENTS

| 4,422,346 | 12/1983 | Nishikawa | 74/493 |
| 4,633,732 | 1/1987 | Nishikawa et al. | 74/493 |

FOREIGN PATENT DOCUMENTS

| 0033570 | 2/1983 | Japan | 74/493 |
| 0191668 | 11/1983 | Japan | 74/493 |

*Primary Examiner*—John J. Love
*Assistant Examiner*—Karin L. Ferriter
*Attorney, Agent, or Firm*—Bachman & LaPointe

[57] ABSTRACT

A powered tilt steering arrangement for a vehicle using a motor which rotates unidirectionally. The powered tilt steering arrangement basically comprises: a steering column having an upper shaft and a steering wheel assembly; a tilt bracket pivotally mounted on a mounting bracket fixed to a vehicle body and on which the steering wheel assembly is mounted; a drive source such as the motor; an actuator in response to a rotational force of the motor for actuating the tilt bracket to pivot through a predetermined angular width with respect to the mounting bracket in a reciprocatory motion; and a lock mechanism for locking the steering assembly when the actuator is stopped so that the steering wheel assembly is placed and held at a desired optimum driving position within the predetermined angular width. In addition, the powered tilt steering arrangement is preferably provided with a jump up mechanism which automatically tilts the steering wheel assembly toward a predetermined upper limit angular position by means of a spring force when the vehicle driver leaves the vehicle through a door so as not to obstruct the driver. Furthermore, the jumped up steering wheel assembly is returned to the originally set optimum driving position when the steering wheel assembly is depressed with the door being closed and the driver restarting the vehicle.

23 Claims, 7 Drawing Sheets

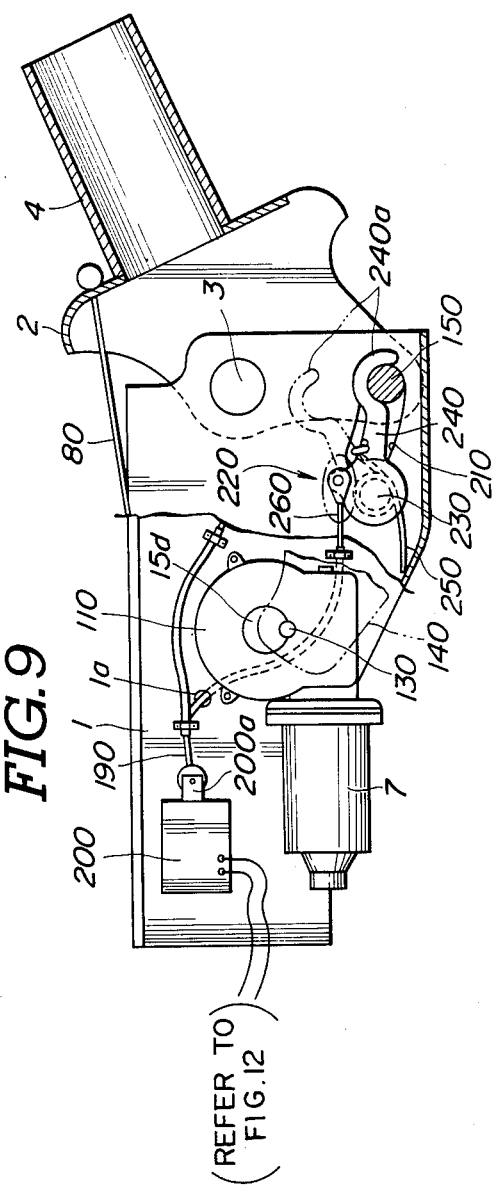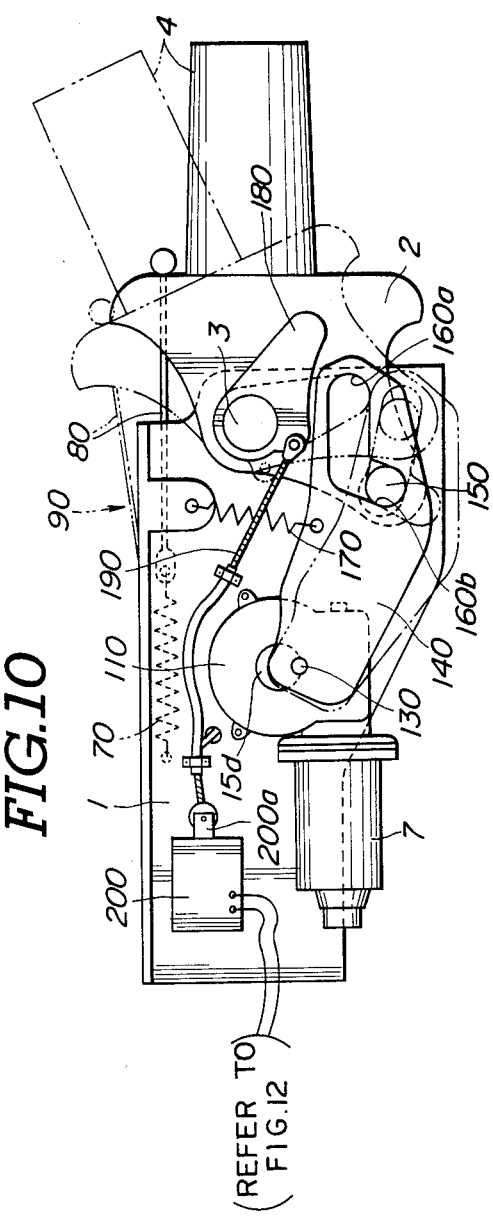

POWERED TILT STEERING ARRANGEMENT

BACKGROUND OF THE INVENTION

The present invention relates generally to a powered tilt steering arrangement applicable to a vehicle steering system. The present invention relates particularly to an electrically powered tilt steering arrangement which basically enables a vehicle driver to set a steering wheel at an optimum driving position the driver desires during a reciprocatory motion thereof. Furthermore, the powered tilt steering arrangement is preferably provided with a steering wheel jump up mechanism operated upon an opening and closure of a door located at the driver's seat.

Various tilt-type steering arrangements have been developed in which the steering wheel can freely be placed at the optimum driving position that the driver desires to improve a comfortable driving of the vehicle. Almost all of such kinds of the tilt-type steering arrangements are purely mechanical and, on the other hand, automated electrical tilt-type steering arrangements are very few.

A conventional electrically powered tilt steering arrangement is exemplified by a Japanese Patent Application Unexamined Open No. Sho 59-230861 published on Dec. 25, 1984.

In the above-identified Patent Application document, a rotational movement of a motor is transmitted to a male screw to which a female screw is spirally screwed. The female screw serves to convert the rotational movement of the motor into a reciprocatory movement itself. This reciprocatory movement of the female screw permits a tilt bracket pivotally supporting the steering wheel part to be tilted through a desired angle.

Since the electrically powered tilt steering arrangement disclosed in the above-identified Japanese Patent Application document requires that the rotational movement of the motor is converted into the reciprocatory movement by means of the male and female screws, both male and female screws needs to be rotated in both normal and reverse directions. Consequently, the motor is reversible.

Therefore, such an electrical equipment as a drive circuit for driving the reversible motor in both normal and reverse directions, or switch or relay device therefor is accordingly required. In addition, the construction of the above-described powered tilt steering arrangement becomes complicated and many mechanical and electrical troubles are easy to occur. If the electrical equipment fails, the fault cannot easily be located. In this way, the arrangement has a maintenance difficulty.

In addition, since the motor is reversible and the male and female screws are spirally screwed together, abrasions of the threaded portions of both screws are unlikely as the result of a long-term operation so that a problem of durability arises. Therefore, the above-described powered tilt steering arrangement lacks practicability.

The above-described conventional electrically powered tilt steering arrangement has inherently many problems in terms of the mechanical and electrical constructions. Therefore, it is difficult to reduce such a powered tilt steering arrangement into practice.

Other conventional steering arrangements are exemplified by a Japanese Patent Application Unexamined Open No. 60-88680 published on May 18, 1985 and Japanese Patent Application Unexamined Open No. 60-157962 published on Aug. 19, 1985.

In the above-identified Japanese Patent Application documents, a so-called jump up mechanism which tilts the steering wheel toward a maximum upper limit in relation to a mounting bracket is incorporated into a manually operated or powered tilt steering arrangement in order to prevent the steering wheel from obstructing the driver's body when he leaves a driver's seat through the door with the steering wheel set at any driving position.

However, since such jump up mechanisms as disclosed in the above-identified other two Japanese Patent Application documents do not tilt the steering wheel toward the maximum upper limit instantaneously but tilt it at the same relatively slow speed as the adjustment operation of the steering wheel at the optimum driving position, it takes time and they are not suitable for the improvement in easiness of the driver's getting on and off the vehicle. In addition, readjustments of the optimum driving positions are necessary whenever the driver gets on the vehicle to drive the vehicle. In this way, the conventional tilt steering arrangements disclosed in the above-identified other two Japanese Patent Application documents also have many problems.

SUMMARY OF THE INVENTION

With the above-described problems in mind, it is an object of the present invention to provide a powered tilt steering arrangement which has a simple construction and has easiness in maintenance.

It is another object of the present invention to provide the powered tilt steering arrangement which has high durability and has a high safety construction.

It is still another object of the present invention to provide the powered tilt steering arrangement for the vehicle which can easily be set at an optimum driving position that the vehicle driver desires and can be constructed for a convenience when the driver gets on and off the vehicle.

The above-described objects can be achieved by providing an arrangement comprising: (a) a steering column having an upper shaft and a steering wheel assembly; (b) a tilt bracket pivotally mounted on a mounting bracket fixed to a vehicle body and on which the upper shaft and steering wheel assembly are mounted; (c) a drive source; (c) first means in response to a drive force of the drive source for actuating the tilt bracket to pivot through a predetermined angular width with respect to the mounting bracket in a reciprocatory motion; and (d) second means for locking the tilt bracket when the first means is stopped so that the steering wheel assembly is placed and held at a desired optimum driving position within the predetermined angular width.

BRIEF DESCRIPTION OF THE PREFERRED EMBODIMENTS

A more complete understanding of the present invention may be obtained from the following detailed description taken in conjunction with the attached drawings in which:

FIG. 9 is a partially sectioned side view of the essential part shown in FIGS. 7 and 8;

Figure 7:
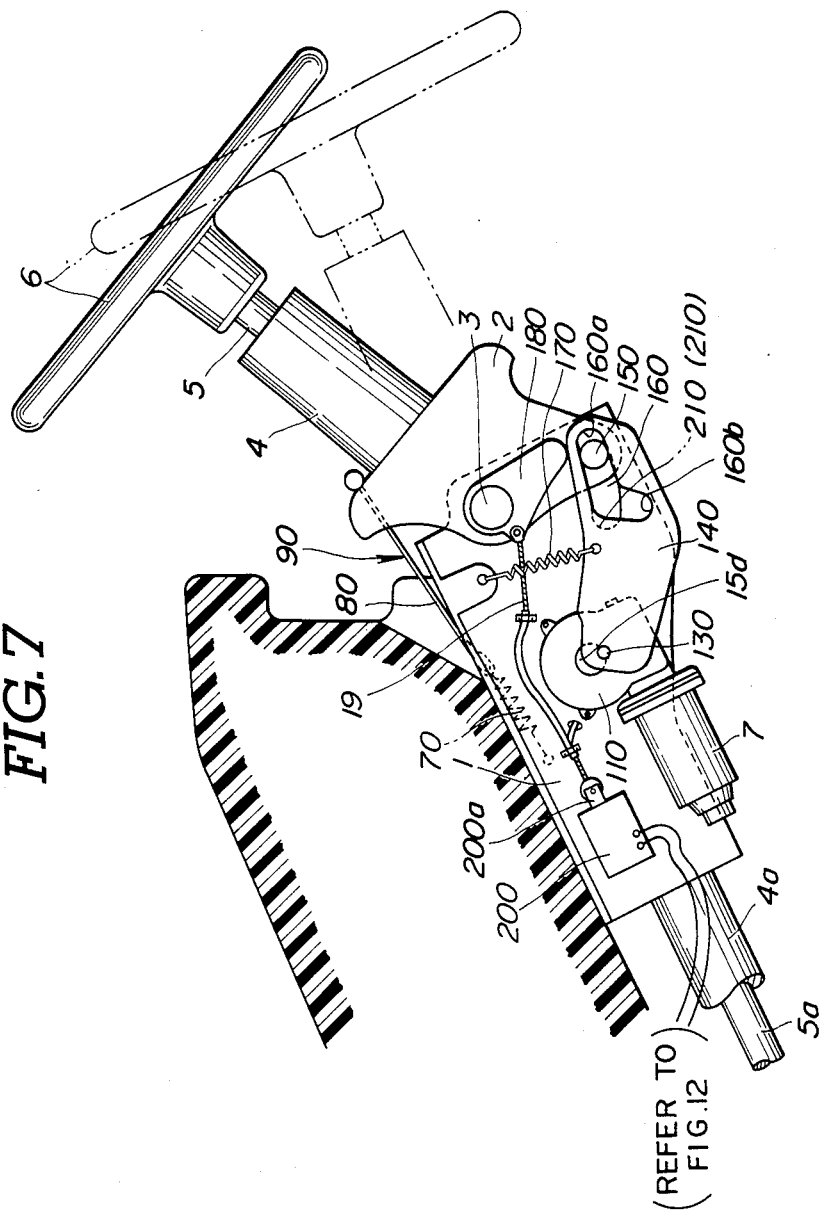
FIG. 7 is a partially sectioned side view of the tilt steering arrangement with a jump up mechanism in a fifth preferred embodiment according to the present invention.
Figure 8:
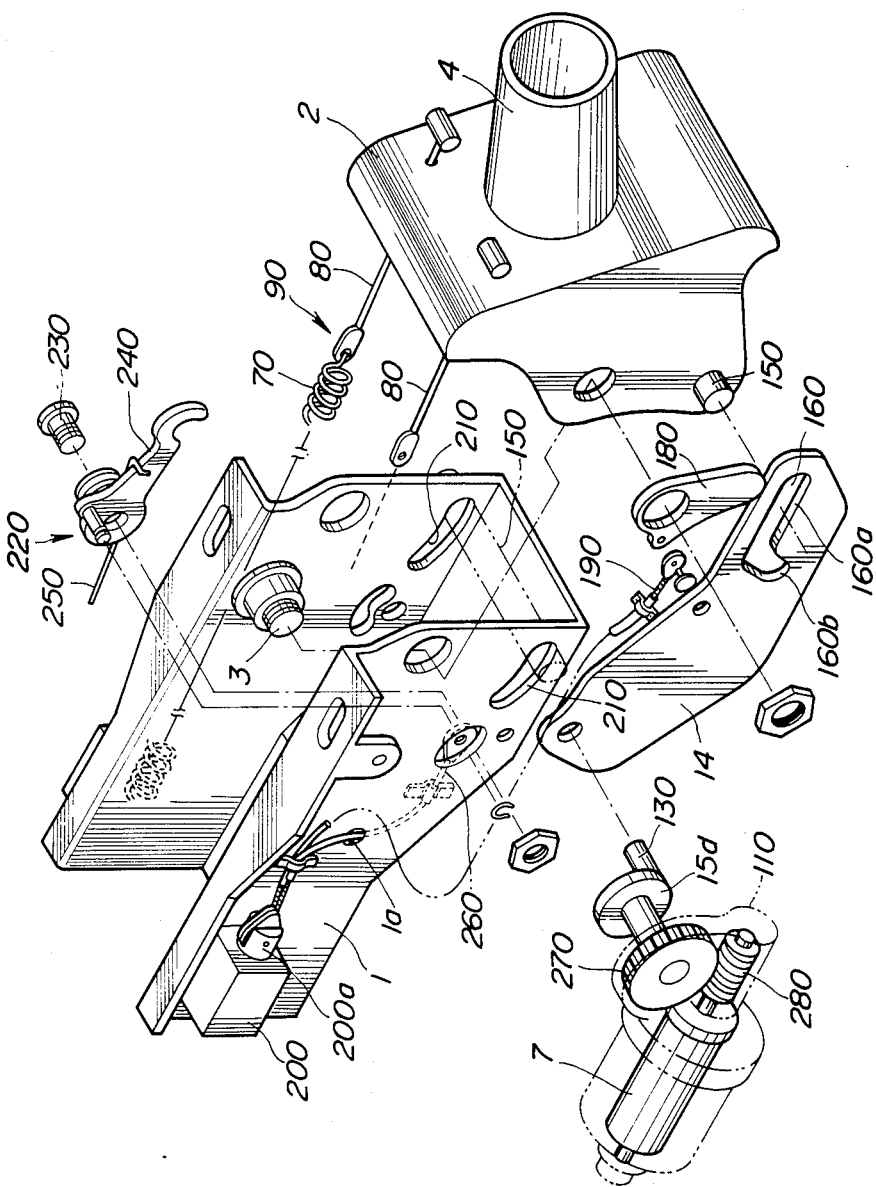
FIG. 8 is an essential part exploded perspective view of the tilt steering arrangement with the jump up mechanism in the fifth preferred embodiment shown in FIG. 7.
Figure 11:
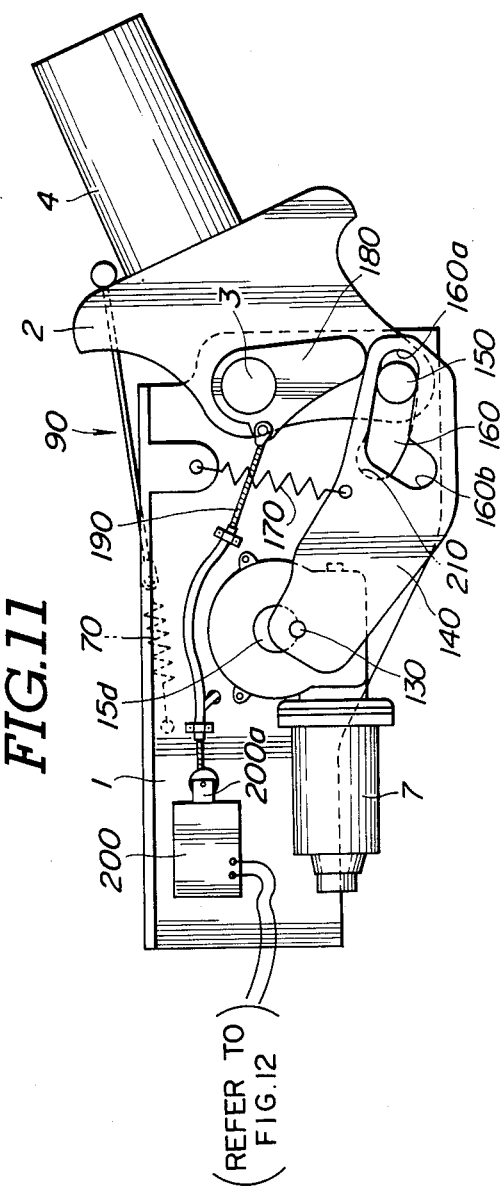
Figure 12:
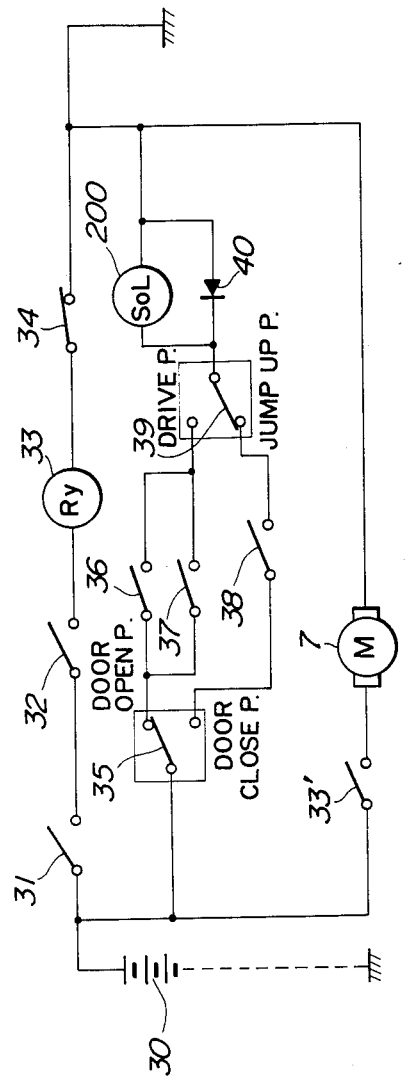

FIGS. 10 and 11 are explanatory views of the essential part shown in FIGS. 7 through 9; and FIG. 12 is a simplified electrical circuit wiring diagram of a control circuitry of the tilt steering arrangement shown in FIGS. 7 through 11.

DETAILED DESCRIPTION OF THE PREFERRED EMBODIMENTS

Reference will hereinafter be made to the drawings in order to facilitate understanding of the present invention.

The conventional tilt steering arrangements has been described in the background of the invention.

FIRST PREFERRED EMBODIMENT

Figure 1:
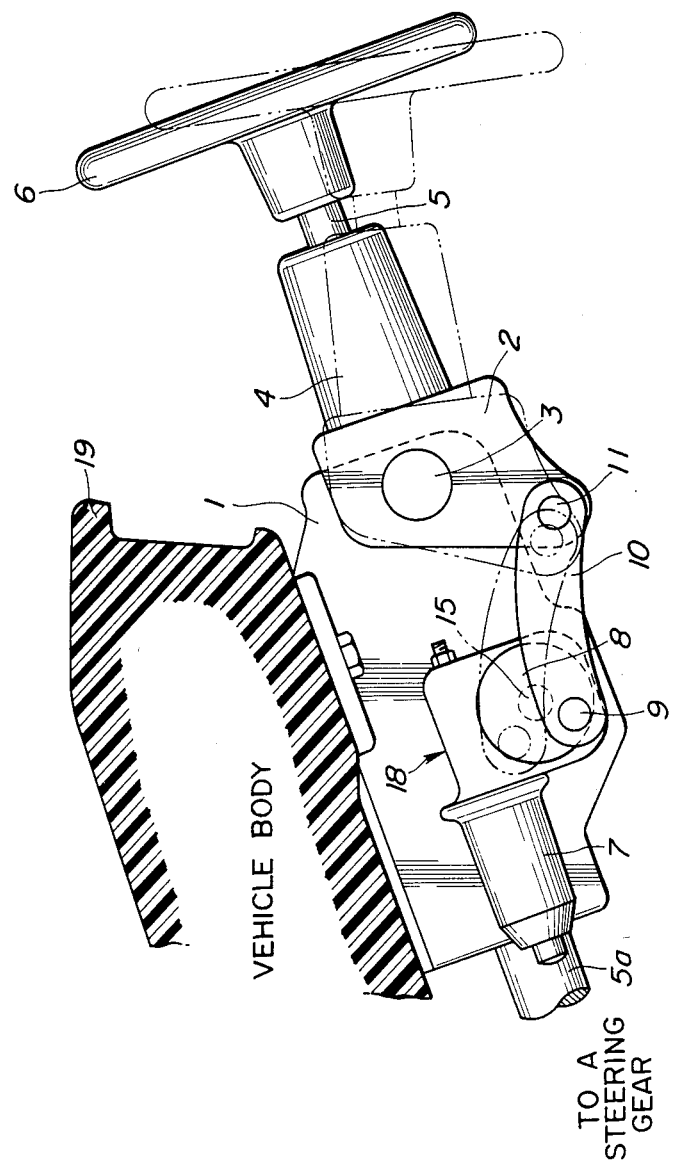
FIG. 1 is a partically sectioned side view of an electrically powered tilt steering arrangement in a first preferred embodiment according to the present invention.
Figure 2:
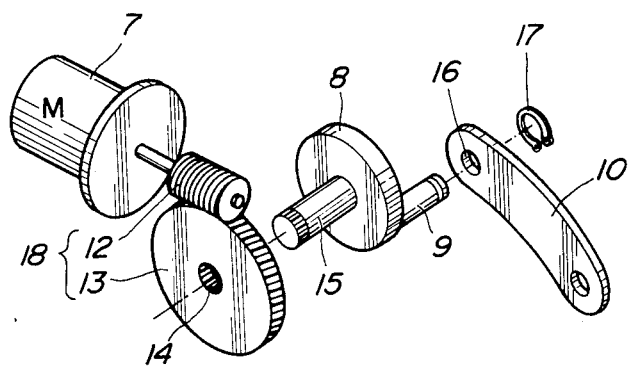
FIG. 2 is an essential part exploded perspective view of the tilt steering arrangement shown in FIG. 1.

FIGS. 1 and 2 show a first preferred embodiment according to the present invention.

In FIGS. 1 and 2, a tilt bracket 2 is pivotally mounted on a mounting bracket 1 by means of a tilt hinge pin 3 and an upper tubular member 4 is extended from the tilt bracket 2. An upper shaft 5 of a steering column is inserted through the upper tubular member 4. A steering wheel 6 is fixed to an upper end of the upper shaft 5. A lower shaft 5a of the steering column is coupled to a lower end of the upper shaft 5 via a universal joint (not shown) installed within the mounting bracket 1.

On the other hand, an electric motor 7 is attached to a side surface of the mounting bracket 1. It should be noted that the motor 7 is not reversible. A crank arm 8 connected to the motor 7 via a member 18 for transmitting the rotation force of the motor 7 is provided with an eccentric shaft 9. One end of a link 10 is pivotally mounted on the eccentric axle 9. The other end of the link 10 is extended toward the tilt bracket 2 and pivotally attached to the lower part of the tilt bracket 2 via a shaft 11.

FIG. 2 shows a specific structure of the rotation transmitting member 18 described above.

The transmitting member 18 includes a worm gear constituted by a worm 12 extended from an output shaft of the motor 7 and worm wheel 13 engaged with the worm 12. An axle hole 14 of the worm wheel 13 is formed with a serration to fit a crankshaft 15 projected from the crank arm 8 thereinto. It is noted that a serration is also formed at a periphery of an extended end of the crankshaft 15. The eccentric shaft 9 is cranked with respect to the crankshaft 15 projected from the crank arm 8 and is inserted through a hole 16 of the link 10. A C-shaped ring 17 is fastened to an extended end of the eccentric shaft 9 protruded from the hole 16.

An action of the first preferred embodiment will be described below.

It is noted that a power switch (not shown in FIGS. 1 and 2) is installed on an appropriate position of an instrument panel 19 and is electrically connected to a vehicle battery (not shown in FIGS. 1 and 2). When the power switch is turned on by an operator, the motor 7 is driven. When the motor 7 starts a unidirectional rotation, the worm 12 causes the worm wheel 13 to rotate so that the crank arm 8 is accordingly rotated. Then, as the crank arm 8 is rotated, the eccentric shaft 9 takes a form of a crank motion.

Hence, since one end of the link 10 pivotally attached to the eccentric shaft 9 is swung and displaced along a rotation locus of the eccentric shaft 9, the link 10 pushes or pulls the tilt bracket 2 so that the tilt bracket 2 is pivoted upward and downward about the hinge pin 3. Hence, as long as the power switch remains on, the tilt bracket 2 is reciprocated between a maximum and minimum tilt angles determined chiefly according to a length of the link 10. When the steering wheel 6 together with the tilt bracket 2 is tilted at a desired tilt angle in relation to the hinge pin 3 and the power switch is simultaneously turned off, the tilt bracket 2 is rested at that tilt angle. When the tilt bracket 2 stands still at that particular angle and an external force is imposed on the steering wheel 6 to move it in either upper or lower direction in relation to the mounting bracket 1, the crank arm 8 on which the one end of the link 10 is pivotally mounted will not be pivoted due to the presence of the worm gear, i.e., the engagement state of the worm 12 with the worm wheel 13. Hence, the steering wheel 6 can be rested and firmly fixed on the above-described set angular position without a special locking mechanism. The first embodiment described above provides a basic structure from among all other preferred embodiments to be described later.

SECOND PREFERRED EMBODIMENT

Figure 3:
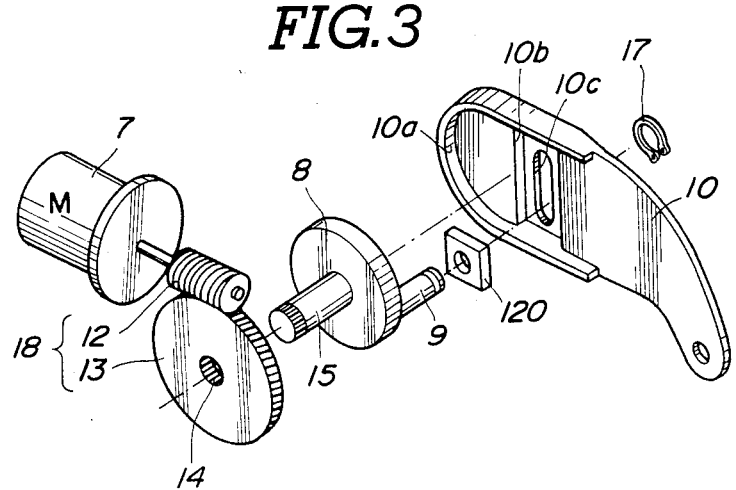
FIG. 3 is an essential part exploded perspective view of the tilt steering arrangement in a second preferred embodiment according to the present invention.

FIG. 3 shows a second preferred embodiment according to the present invention.

The side view of the second preferred embodiment is the same as shown in FIG. 1.

In this embodiment, only the structure of the link 10 is substantially different from that described in the first preferred embodiment shown in FIGS. 1 and 2.

That is to say, since the one end of the link 10 engaged with the eccentric shaft 9 takes a motion in both X-axis (horizontal axis direction as viewed from FIG. 2) and Y-axis directions (vertical axis direction as viewed from FIG. 2) of the crank arm 8 due to the crank motion of the eccentric shaft 9, an unnecessary force in the Y-axis direction is suppressed as low as possible. To this end, a frame portion 10a to which the crank arm 8 is fitted is formed vertically on one end of the link 10, a guide portion 10b is formed along the Y-axis direction of the crank arm 8 within the frame portion 10a, and an elliptical hole 10c is formed within the guide portion 10b. In addition, a slide member 120 is slidably fitted into the guide portion 10b. The eccentric shaft 9 is extended through the slide member 120. The eccentric shaft 9 is furthermore inserted through the elliptical hole 10c. The C-shaped ring 17 is fastened to the periphery of the eccentric shaft 9 projected at the outside of the link 10 in order to prevent the eccentric shaft 9 from being pulled out of the link 10.

In this embodiment, as the crank arm 8 is rotated within the frame portion 10a of the link 10, the eccentric shaft 9 takes the form of the crank motion. This motion is transmitted to the link 10 in such a way that the slide member 18 is guided vertically along the guide portion 10b so as to move in the Y-axis direction. Consequently, the motion of the link 10 in the Y-axis direction is cancelled thereat and only the motion of the X-axis directional component in the eccentric shaft 9 is transmitted to the link 10. On the other hand, when the crank arm 8 is stopped, i.e., the steering wheel 6 is set to the desired angle, the slide member 18 will not move along the guide portion 10b and the set angle of the steering wheel 6 will remain unchanged. Such a locked state as described above is maintained if the external force is imposed on the steering wheel 6 is tilt it at another angular position so that the steering wheel 6 and tilt bracket 2 is pivoted about the hinge pin 3 and the link 10 is moved in the X-axis direction. This is because even if the rotational force of the worm wheel 13 is transmitted through the link 10 and eccentric shaft 9, the rotational force of the worm wheel is not transmitted to the worm 12 since they are always engaged with each other, in the same way as described in the first preferred embodiment. In this way, since the component of the Y-axis directional motion of the eccentric shaft 9 is cancelled by means of the slide member 120, guide portion 10b, and elliptical hole 10c, the link 10 is not moved in the Y-axis direction but the eccentric shaft 9 transmits only the X-axis directional force required for the tilt movement of the tilt bracket 2 to the link 10.

THIRD PREFERRED EMBODIMENT

The side view of the powered tilt steering arrangement is the same as that shown in FIG. 1, in a third preferred embodiment.

Figure 4:
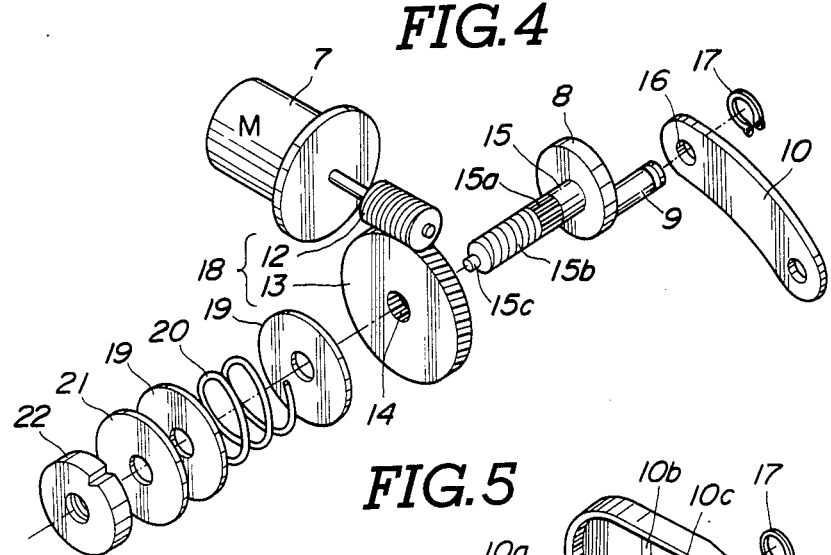
FIG. 4 is an essential part exploded perspective view of the tilt steering arrangement in a third preferred embodiment according to the present invention.

FIG. 4 shows an essential part, i.e., the rotation transmitting member 18 of the powered tilt steering arrangement in the third preferred embodiment.

The rotation transmitting member 18, in this embodiment, includes the set of worm gear constituted by the worm 12 (which serves as the output axis of the motor 7) and the worm wheel 13 (which is engaged with the worm 12). The serration is formed on the inner periphery of the center hole 14 of the worm wheel 13. The crankshaft 15 of the crank arm 8 is fitted into the serrate hole 14 of the worm wheel 13. The eccentric shaft 9 is integrated with the crank arm 8 and the crankshaft 15. The eccentric shaft 9 is inserted through the hole 16 of the link 10 and its extended end projected from the hole 16 is the C-shaped ring 17. The above-described structure is substantially the same as that in each of the first and second preferred embodiments. However, in this embodiment, it should be noted that the crankshaft 15 has: a serration portion 15a engaged with the corresponding serration formed on the inner periphery of the center hole 14 of the worm wheel 13; a screw portion 15b; and a small projection 15c having a diameter smaller than that of the screw portion 15b and which is extended from the end of the screw portion 15b.

The serration 15a of the crank shaft 15 is fitted into the worm wheel 13 as described above. The screw portion 15b extended outwardly from the worm wheel 13 is engaged with dish springs 19, 19, coil spring 20, washer 21, and nut 22. The nut 22 threaded into the screw portion 15b serves to bring the coil spring 20 into close contact with a side surface the worm wheel 13 under pressure.

Figure 6:
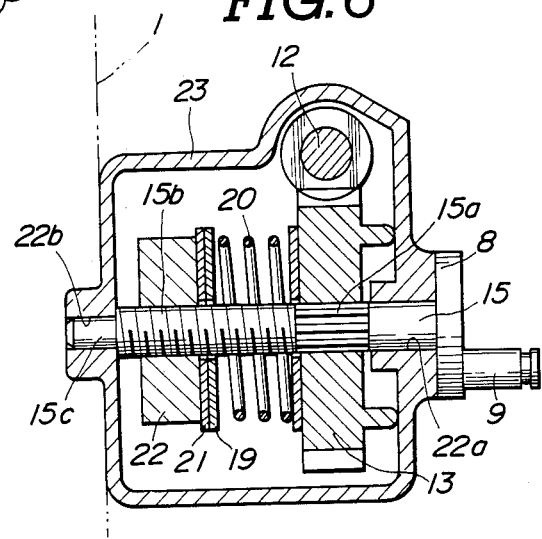
FIG. 6 is an essential part longitudinally sectioned view of both third and fourth preferred embodiments shown in FIGS. 4 and 5.

FIG. 6 shows the sectional view of the transmitting member 18 in the third preferred embodiment when assembled.

As shown in FIG. 6, the above-described parts constituted by the worm 12, worm wheel 13, and axle 15 are housed within a housing 23. The housing 23 is fixed to a side wall of the mounting bracket 1. The crankshaft 15 and small projection 15c are journaled into holes 22a, 22b of the housing 23. The worm wheel 13 is brought into frictional contact with an inner wall of the housing 23.

An action of the third preferred embodiment will briefly be described below.

The action of the third preferred embodiment after the power switch is turned on is substantially the same as that in the first preferred embodiment.

When the steering wheel 6 including the tilt bracket 2, upper shaft 5, and tubular member 4 is tilted at the desired angle with the power switch turned off, the tilt bracket 2 is rested and locked at the desired angular position. When the tilt bracket 2 is rested at that particular angle, the crank arm 8 on which the one end of the link 10 is pivotally mounted will not pivot due to the engagement of the worm 12 with the worm wheel 13 as described above and due to a frictional force of the worm wheel 13 against the inner wall of the housing 23 by of the coil spring 20. Hence, the steering wheel 6 can be rested and more firmly fixed to the above-mentioned set position without a special locking mechanism. Consequently, the steering wheel 6 is firmly rested and held to the set position without positional deviations from the set position so that the driver will not feel anxiety during the driving of the vehicle.

FOURTH PREFERRED EMBODIMENT

Figure 5:
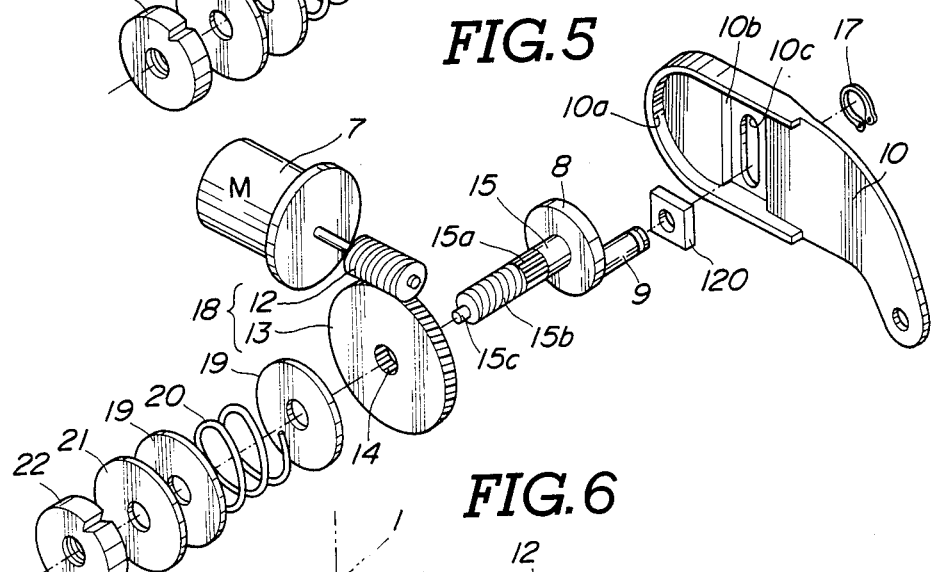
FIG. 5 is an essential part exploded perspective view of the tilt steering arrangement in a fourth preferred embodiment according to the present invention.

FIG. 5 shows the essential part, i.e., the rotation transmitting member 18 and surrounding parts of the powered steering arrangement in a fourth preferred embodiment according to the present invention.

Since the whole structure of these parts is the combination of the second preferred embodiment shown in FIG. 3 and third preferred embodiment shown in FIG. 4, the detailed descriptions of the structure and action are omitted here.

In this embodiment, when the crank arm 8 is stopped, i.e., the steering wheel 6 is set to the desired angle, the slide member 120 does not move (the worm 12 and worm wheel 13 are not rotated) and the set angle of the steering wheel 6 consequently remains unchanged. If the external force is imposed on the steering wheel 6 to tilt any other tilt position, the link 10 will not be moved and thus the tilt bracket 2 will also not be pivoted in relation to the mounting bracket 1. This is because even if the rotational force is imposed on the worm wheel 13, the rotational force of the worm wheel 13 is not transmitted to the worm 12 due to the presence of the worm gear 18, in details, since the worm wheel 13 is engaged with the worm 12 and since the worm wheel 13 is furthermore depressed against the inner wall of the housing 23, as shown in FIG. 6. The other effects are the same as those in the second and third preferred embodiments.

FIFTH PREFERRED EMBODIMENT

FIG. 7 shows a side view of the whole powered steering arrangement in a fifth preferred embodiment according to the present invention.

FIG. 8 shows an internal structure of the mounting bracket 1 in the fifth preferred embodiment.

Since the same numerals as those shown in FIG. 1 designate corresponding elements, the detailed descriptions of the individual structures of the elements are omitted here. The lower shaft 5a of the steering column is inserted through a lower tubular member 4a as shown in FIG. 7. In addition, a coil spring 70 and solid wire 80, both constituting resilient means 90, are loaded between the mounting bracket 1 and tilt bracket 2. The tilt bracket 2 is biased to pivot upward around the center of the tilt hinge pin 3 with respect to the mounting bracket 1 by means of the resilient means 90.

On the other hand, the motor 7 fixed to a side wall portion of the mounting bracket 1 and a speed reducer 110 of the motor 7 have an integrated output wheel 15d is provided with an eccentric shaft 130. One end of a link 140 is pivotally mounted on the eccentric shaft 130 and the other end of the link 140 is movably attached to lower part of the tilt bracket 2 via a pin 150 and elongated hole 160. The elongated hole 160 is bent substantially in an inverted letter V shape and is constituted by a slide part 160a and lock part 160b to be described later. Therefore, the link 140 can be moved toward both two directions;, i.e., an elongation direction thereof and a width direction thereof. In addition, a spring 170, e.g., a coil type spring, is loaded between the link 140 and mounting bracket 1. Therefore, the link 140 is also biased to move toward the engagement direction of both lock part 160b of the elongated hole 160 and pin 150, i.e., toward a jump up direction to be described later. Furthermore, a cam 180 contacted with the link 140 is pivotally supported on the tilt hinge pin 3 so as to enable pivotal movement of the tilt bracket 2 about the tilt hinge pin 3. One end of a twisted wire 190 is connected to one side edge of the cam 180 so that the cam 180 is operatively pivoted in a clockwise direction as viewed from FIG. 7. The other end of the wire 190 is connected to a plunger 200a of a solenoid 200. It should be noted that a motor may be used in place of the solenoid 200. The solenoid 200 is fixed to a side wall of the mounting bracket 1. The solenoid 200 provides an electromagnetic drive means for the plunger 200a to operatively draw the wire 190 toward itself by a predetermined stroke.

Furthermore, the pin 150 of the tilt bracket 2 is extended toward the depth direction as viewed from FIG. 7, is inserted through the opposing side wall of the tilt bracket 2 and is fixed thereto. The mounting bracket 1 is formed with a pair of arcuate holes 210, 210 so that the pin 150 can be moved through the arcuate holes 210, 210 as the tilt bracket 2 is pivoted on the hinge pin 3. The mounting bracket 1 is furthermore provided with locking means 220 which can be engaged with and disengaged from the pin 150, as shown in FIG. 8.

FIG. 9 shows the internal structure of the mounting bracket 1.

The locking means 220 includes: an shaft 230 fixed to the inner wall of the mounting bracket 1; a lever 240 pivotally supported on the shaft 230 and having a hook portion 240a; a spring 250 for biasing the lever 240 to pivot toward a clockwise direction as viewed from FIG. 9, the spring 250 being wrapped about the lever 240; and another twisted wire 260 whose one end is connected to the lever 240. The lever 240 is forcefully pivoted toward a counterclockwise direction as viewed from FIG. 9 via the wire 260 against the biasing force of the spring 250. It is noted that the other end of the twisted wire 260 is extended through a hole 1a of the mounting bracket 1 and is connected to the plunger 200a of the solenoid 200 together with the other wire 190.

The speed reducer 110 (also referred to as the rotation transmitting member 18 described above) is constituted by the set of worm gear including the worm wheel 270. The output axle of the motor 7 is constituted by the worm 280 engaged with the worm wheel 270.

It is noted that the above-described solenoid 200 is energized in response to electrical signals indicating that a door (e.g., door at a side of the driver's seat) is open and closed. The solenoid 200 constitutes circuit means for detecting the opening or closure of the door in the powered tilt steering arrangement. As an alternative, the solenoid 200 may be energized in response to a turn-on operation of a switch installed within a passenger compartment.

An action of the above-described fifth preferred embodiment will be described below with reference to FIGS. 9 through 11.

First, an operation for setting the steering wheel 6 to an optimum driving position of the driver will be described.

In FIGS. 9 and 10, when the door is open, the solenoid 200 is energized in response to the signal indicating that the door is open. At this time, the plunger 200a of the solenoid 200 draws both twisted wires 190, 260 toward a left side as viewed from FIG. 10. When the wire 190 is drawn by the predetermined stroke toward the solenoid 200 by means of the solenoid 200, the cam 180 is pivoted in the clockwise direction about the tilt hinge pin 3 and, on the other hand, the lever 240 shown in FIG. 9 is pivoted in the counterclockwise direction on the shaft 230. Hence, the cam 180 presses against the link 140 downward as denoted by a phantom line in FIG. 10 and the hook portion 240a of the lever 240 is disengaged from the pin 150 as denoted by a phantom line in FIG. 9. Then, if the driver (operator) imposes a force downward on the steering wheel 6, the tilt bracket 2 is pivoted in the clockwise direction about the tilt hinge pin 3 and the pin 150 is moved from the slide portion 160a at the rightmost position of the elongated hole 16 to the lock portion 160b at the leftmost position. On the other hand, since the solenoid 200 has caused its plunger 200a to stop at the predetermined stroke, the cam 180 is, in turn, pivoted in the counterclockwise direction by means of the spring force of the spring 170. The link 140 is biased to move upward by means of the spring 170. In addition, the lever 240 is moved in the clockwise direction by means of the spring force of the spring 250. Consequently, the cam 180 is returned to its original position since the lower end of the cam 180 is pressed against the link 140. At this time, since the pin 150 is displaced from its original position, the pin 150 cannot locked again.

Then, when a power switch of the motor 7 is turned on, the above-described worm 280 is accordingly rotated and the above-described worm wheel 270 is rotated at a speed determined by a gear ratio of the worm and worm wheel. As the worm wheel 270 is rotated, the output wheel 15d is rotated so that the eccentric shaft 130 is cranked. The crank motion of the eccentric axle 130 causes the one end of the link 140 to rotate along a rotational locus of the eccentric shaft 130 so that the link 140 swings in the upward and downward directions and in the leftward and rightward directions as viewed from FIG. 10. At this time, since the cam 180 is pivoted in the counterclockwise direction as viewed from FIG. 10 and is not brought into contact with the link 140, as shown in FIG. 10, the biasing force of the spring 170 causes the link 140 to pivot in the counterclockwise direction and the pin 150 of the tilt bracket 2 is slided into the lock portion 160b of the elongated hole 160 in the link 140.

Hence, as the link 140 is moved in response to the crank operation of the eccentric shaft 130, the tilt bracket 2 is pivoted about the tilt hinge pin 3. That is to say, as long as the motor 7 is driven, the link 140 swings so that the tilt bracket 2 repeats the reciprocatory movement in the up-and-down directions between the maximum and minimum tilt angles. Although the reciprocatory movement of the tilt bracket 2 can be set in either a relatively high speed mode or a relatively low speed mode according to the gear ratio between the worm 280 and worm wheel 270, it is more advantageous for the driver that the reciprocatory movement is set in the relatively low speed mode for the driver to set the steering wheel 6 to the optimum driving position.

In this way, when the tilt bracket 2 is pivoted and the upper tubular member 4 is tilted at a desired angle so that the steering wheel 6 reaches the optimum driving position, the driver may only turn off the power switch of the motor 7. When the motor 7 stops, the link 140 is locked due to the engagement of the worm 280 with the worm wheel 270 as described in the previous embodiments. Hence, since the tilt bracket 2 is not pivoted any more but locked, the optimum driving position of the steering wheel 6 can stably be maintained.

Next, an operation of the jump up mechanism will be described below with also reference to FIGS. 9 through 11.

When the driver sat on the driver's seat leaves the vehicle through the door with the optimum driving position of the driver set as denoted by the solid line in FIG. 10, the solenoid 200 is energized in response to the electrical signal indicating that the door has been opened so that the one wire 190 is drawn by the predetermined stroke toward the solenoid 200. At this time, the cam 180 is, in turn, pivoted in the clockwise direction about the tilt hinge pin 3, as shown in FIG. 11. Therefore, the cam 180 is brought in contact with the link 140 and pushes the link 140 downward against the biasing force of the spring 170 and then the link 140 is pivoted on the eccentric shaft 130 in the clockwise direction. At this time, the link 140 causes the pin 150 inserted within the elongated hole 160 to be moved toward the slide portion 160a at the rightmost position of the hole 160.

When the pin 150 is moved to the slide portion 160a of the elongated hole 160, the tilt bracket 2 is unlocked and becomes in a pivotable state on the tilt hinge pin 3. Consequently, the biasing force of the resilient means 90 causes the tilt bracket 2 to jump up as shown in FIG. 11. On the other hand, although the lever 240 is pivoted in the counterclockwise direction at the same time when the cam 180 is pivoted in the clockwise direction in response to the force of the plunger 200a transmitted through the wire 190, this action is a mere interlock motion and the lever 240 is returned to the original position by means of the biasing force of the spring 250.

As the lever 240 is returned to the original position, the pin 150 of the tilt bracket 2 is placed at a position engageable with the hook portion 240a so that the hook portion 240a is engaged with the pin 150. Consequently, the tilt bracket 2 is firmly fixed so as to disable the pivotal movement thereof, as shown in FIG. 9.

At this time, since the steering wheel 6 is locked, the driver may leave the vehicle, applying a force to the locked steering wheel 6. Thus, the locked steering wheel 6 provides convenient means for the driver to get off the vehicle.

Furthermore, in this embodiment, when the driver restarts the vehicle driving, the powered tilt steering arrangement mechanically stores the optimum driving position already set before the driver has left the vehicle through the door.

In more details, when the driver reopens the door in order to restart the driving of the vehicle, the solenoid 200 is energized in response to the signal indicating that the door has been opened so that the wire 190 is drawn by the predetermined stroke toward the solenoid 200. Consequently, both cam 180 and lever 240 are simultaneously pivoted on the hinge pin 3 and on the eccentric shaft 130 in clockwise and counterclockwise directions, respectively. While the cam 180 is brought in contact with the link 140 to press it downward, the hook portion 240a of the lever 240 is separated from the pin 150. Hence, the tilt bracket 2 is unlocked and becomes in a pivotable state. Then, if a force by the driver is imposed on the steering wheel 6 to tilt downward, the tilt bracket 2 is accordingly pivoted in the clockwise direction about the tilt hinge pin 3. When the steering wheel 6 is pressed downward as low as possible, the pin 150 of the tilt bracket 2 is moved from the rightmost end of the elongated hole 160 to the leftmost end. On the other hand, since the solenoid 200 is deenergized, the cam 180 and lever 240 are pivoted on the hinge pin 3 and on the eccentric shaft 130 in the counterclockwise and clockwise directions by means of the forces of the springs 170, 250, respectively. Then since the solenoid 200 is deenergized and the cam 180 is separated from the link 140, the link 140 is pivoted upward in the counterclockwise direction due to the force of the spring 170 so that the pin 150 is moved down into the lock portion 160b of the elongated hole 160. Since the pin 150 is engaged with the lock portion 160b, its state corresponds to the original optimum driving position set before the restart of the driving. This is because when the link 140 is pivoted on the eccentric shaft 130 at the time of the jump up operation, the position of the eccentric shaft 130 never changes. This means that a preparation for the steering wheel 6 to return to the original set position is always ended.

In the way described above, when the driver restarts the driving of the vehicle, the optimum driving position of the steering wheel 6 at which the driver has originally set can mechanically be memorized from the position of the eccentric shaft 130. Consequently, in this embodiment, there is no need for readjustment of the optimum driving position whenever the driver restarts the driving of the vehicle. Therefore, the driver can immediately drive the vehicle merely by pressing the steering wheel 6 downward when the driver sits on the driver's seat.

FIG. 12 shows an electrical circuit configuration of the powered tilt steering arrangement in the fifth preferred embodiment.

In FIG. 12, a positive electrode of a battery 30 (a power supply) of the vehicle is connected to an ignition switch 31. A tilt switch 32, relay part 33, and a zero vehicle speed detection switch 4 are connected in series with the battery 30 via the ignition switch 31. The zero vehicle speed detection switch 34, e.g., comprises a microswitch which is open, when a vehicle speedometer starts moving. That is to say, when the needle thereof indicates zero, the microswitch is closed. On the other hand, a door switch 35, a transmission lever position detection switch 36, a lock switch 39, and solenoid 200 are also connected in series with the battery 30. The door switch 5 comprises, e.g., a switch installed on a bottom end of the door at the side of the driver's seat for lighting on a room lamp when the door is open and for lighting off it when the door is closed. The transmission lever position detection switch 36 is turned on when a transmission lever of the vehicle is placed in a neutral or parking position. The lock switch 39 detects the optimum driving position of the steering wheel 6 and the jump up state. Specifically, two microswitches which detect the tilt movement of the above-described pin 150 of the tilt bracket 2 are installed within the mounting bracket 1. When the steering wheel 6 is jumped up i.e., tilted toward its upper limit by spring means, one of the microswitches located at a seat switch side 38 is closed.

A brake switch 37 for detecting that the brake is operated is connected across the transmission lever position detection switch 36. In addition, the seat switch 38 is connected between the door switch 35 and lock switch 39. The seat switch 38 is closed when the driver sits down on the driver's seat. It is noted that a flywheel diode 40 for sensing a spark discharge across the solenoid 200 is connected across the solenoid 200. Furthermore, the motor 7 and a relay switch 33' are connected in series with the battery 30. A negative electrode of the battery 30 is grounded.

In the control circuit shown in FIG. 12, when the ignition switch 31 is turned on, the zero vehicle speed detection switch 34 is turned on, and the tilt switch 32 is turned on, the motor 7 starts since the relay switch 33 is closed. On the other hand, when either of the two switches 36, 37 or the seat switch 38 is closed and door switch 35 is placed at the door closure position, the solenoid 200 is energized.

When, with the tilt bracket 2 not placed at the jump up position, and therefore the lock switch 39 placed at a drive position, the driver opens the door, the solenoid 200 is driven via either or both of the two switches 36, 37. The following operation has been described above. As a result of this, the cam 180 depresses the link 140 downward and the hook portion 240a of the lever 240 is separated from the pin 150 as shown in FIG. 9. Then when the driver pushes the steering wheel 6 downward, the tilt bracket 2 is pivoted in the clockwise direction on the tilt hinge pin 3 and the pin 150 is moved from the slide portion 160a at the rightmost end of the elongated hole 160 to the lock portion 160b at the leftmost end. On the other hand, when the solenoid 200 is deenergized, the cam 180 is returned to the original position. At this time, since the pin 150 is displaced from its original position, it cannot again be locked by means of the hook portion 240a. When the tilt switch 32 in FIG. 12 is turned on to rotate the motor 7, the worm 280 is rotated together with the worm wheel 270. The following operation in the tilt steering arrangement has already been described.

In this way, as soon as the tilt bracket 2 is pivoted, the upper tubular member 4 is tilted at last to the desired angle, and the steering wheel 6 is accordingly placed at the optimum driving position that the driver desires, the driver turns off the tilt switch 32 to stop the motor 7 so that the steering wheel 6 is rested on the optimum driving position.

Next, when the driver leaves the driver's seat with the steering wheel 6 placed at the optimum driving position, the driver usually operates the side brake or shifts the transmission lever position to the neutral or parking position and thereafter opens the door. At this time, the door switch 35 is placed at the door open position and either or both of the two parallel switches 36, 37 are closed. Since the lock switch 39 is placed at the drive position, the solenoid 200 is again energized. At this time, the wire 190 is drawn by the predetermined stroke toward the solenoid 200 so that the cam 180 is pivoted in the clockwise direction on the tilt hinge pin 3. The following jump up operation in the tilt steering arrangement has already been described. When the jump up operation has been carried out, the lock switch 39 is, in turn, placed at the jump up position.

When the driver restarts the driving of the vehicle, the door switch 35 is placed at the door close position and the seat switch 38 is closed so that the solenoid 200 is again activated since the lock switch 39 remains at the jump up position. The following operation in the tilt steering arrangement has already been described.

EFFECTS

As described hereinabove, since the powered tilt steering arrangement according to the present invention is so constructed that the tilt bracket can be tilted with the reciprocatory movement in the up-and-down directions together with the steering wheel only through a unidirectional rotation of the motor, the tilt bracket can be rested and fixed on the mounting bracket at the desired angle when the motor is stopped with the tilt bracket rested at the desired tilt angular position. In addition, since the motor used rotates unidirectionally, such a control circuit which revolves the motor bidirectionally as described in the background of the invention or other complicated electrical circuit is not needed. In addition, since in the first preferred embodiment the tilt bracket can be tilted by means of the eccentric shaft and link, the whole construction is basically simple, is trouble free, endurable and easy in maintenance. Furthermore if, with the steering wheel set at the desired angle, the steering wheel is depressed to force the tilt bracket to pivot, the tilt bracket will not be pivoted due to the engagement of the worm and worm wheel.

Next, since as described in the preferred embodiments shown in FIGS. 4, 5 and 6, the rotation transmitting member of the powered tilt steering arrangement according to the present invention is housed in the housing which is fixed to the mounting bracket and one element of the worm gear constituting the rotation transmitting member is provided with a frictional force due to the press thereof against the inner wall of the housing, a backlash of the worm gear which easily occurs when the steering wheel is set to the optimum driving position is resisted and extinguished by means of the frictional force generated between the worm wheel and inner wall of the housing. Consequently, the steering wheel does not displace due to a presence of a play between the tilt bracket and mounting bracket so that the driver can drive the vehicle through the steering wheel without anxiety of steering wheel vertical and horizontal deviations.

Finally, since the powered tilt steering arrangement is so constructed as described in the fifth preferred embodiment shown in FIG. 7 through FIG. 12, the steering wheel is automatically jumped up by means of the spring means and is locked when the door is open with the vehicle stopped, the side brake operated and/or the transmission lever shifted in the neutral or parking positions. In addition, when the door is again open in order for the driver to drive the vehicle, the steering wheel is still in the jump up state and is locked. However, when the driver sits on the driver's seat and closes the door, the lock state of the steering wheel is released. Therefore, the steering wheel does not only disturb when the driver gets on and off the vehicle but also can be used as assistance means for the driver to get on and off the vehicle. In this way, the powered tilt steering arrangement provided with the jump up mechanism provides a very convenient means for the vehicle drive.

Since the steering wheel will, in turn, not be jumped up when the side brake is released and/or the transmission shift lever is shifted other than the neutral or parking ranges, the driver can safely drive the vehicle. For example, the steering wheel will not be jumped up even when the driver drives the vehicle rearward with the door open. Since the steering wheel is set at the optimum driving position and the motor is driven only when the vehicle speed indicates zero, the steering wheel will not erroneously move during the running of the vehicle.

In addition, when the driver again drives the vehicle, the lock of the jump up state is automatically released and thereafter the steering wheel is returned to the originally set optimum driving position due to its mechanical memory function when the driver merely depresses the steering wheel. Consequently, there is no need for the driver to set the steering wheel at the optimum driving position whenever the driver drives the vehicle.

In this way, there are many advantages when driving the vehicle in which the powered tilt steering arrangement according to the present invention is mounted.

It will clearly be appreciated by those skilled in the art that the foregoing description is made in terms of the preferred embodiments and various changes and modifications may be made without departing from the scope of the present invention which is to be defined by the appended claims.

What is claimed is:

1. An arrangement comprising:
    (a) a steering column having an upper shaft and a steering wheel assembly;
    (b) a tilt bracket pivotally mounted on a mounting bracket fixed to a vehicle body and on which the upper shaft and the steering wheel assembly are mounted;
    (c) a drive source;
    (d) first means for actuating the tilt bracket to continuously pivot in a reversible manner in upward and downward directions through a predetermined angle with respect to the mounting bracket in response to a driving force of the drive source; and
    (e) second means for locking the tilt bracket when the first means is stopped so that the steering wheel assembly is placed and held at a desired optimum driving angular position within the predetermined angle.

2. The arrangement according to claim 1, wherein said drive source comprises a unidirectional electrical motor.

3. The arrangement according to claim 2, wherein said first means comprises:
    (a) a crank arm assembly having an eccentric shaft and a crankshaft;
    (b) a link assembly, one end of which is pivotally mounted on said tilt bracket and the other end of which is pivotally mounted on the eccentric shaft; and
    (c) third means, disposed between an output shaft of said motor and crankshaft, for transmitting the rotation of said motor to said eccentric shaft so that said crank arm takes a crank motion in response to the rotational force of said motor transmitted through said 4. The arrangement according to claim 3, wherein said third means comprises: a worm aligned with the output shaft of said motor; and a worm wheel engaged with said worm and coupled to said crankshaft.

5. The arrangement according to claim 4, wherein said link assembly comprises an elongated rod having one hole at one end thereof through which the eccentric shaft is inserted and another hole at the other end thereof through which a shaft attached to a lower end of said tilt bracket is inserted.

6. The arrangement according to claim 5, wherein said elongated rod further comprises: (a) a frame portion at the one end of said rod into which the crank arm is fitted; (b) the hole provided at the one end of the rod and in a substantially elliptical form along a width direction of the rod; (c) a guide portion provided at the one end of the rod along the width direction of the corresponding hole; (d) a slide member inserted through said eccentric shaft and guidably moved along said guide portion when said eccentric shaft is rotated so that the as the crank arm takes the crank motion, the elongated rod reciprocates only substantially in the elongated direction thereof and the tilt bracket is pivoted on the shaft through the predetermined angular width.

7. The arrangement according to claim 5, wherein the mounting bracket has a hinge pin at one end thereof about which said tilt bracket is pivoted and wherein the upper shaft is inserted through a tubular member of said tilt bracket located at an upper end of said tilt bracket.

8. The arrangement according to claim 5, wherein said crankshaft has a serration at one periphery end thereof and fitted into an opposing serration at an inner periphery of a center hole of said worm wheel.

9. The arrangement according to claim 5, wherein said crankshaft has a serration at a first periphery end thereof which is fitted into an opposing serratin at an inner periphery of a center hole of said worm wheel and said crankshaft further includes a threaded portion at a second periphery end thereof which is extended from the center hole of said worm wheel and a small projection projected from the end of said crankshaft having a substantially smaller diameter than that of the center axle and which further comprises: at least one spring member penetrated through said threaded portion of the crankshaft, one end of which is pressed against the worm wheel; a nut threaded into the threaded portion of the crankshaft so as to press the end of the spring member against the worm wheel; and a housing having a first hole at one side wall into which said small projection is fitted and a second hole at the other side wall into which the crankshaft is fitted so as to enable the rotation of said crank arm together with said worm wheel, said worm wheel having at least one part brought in close contact with an inner wall of said housing.

10. The arrangement according to claim 9, wherein said spring assembly comprises at least one dish-shaped spring and at least one coil spring.

11. The arrangement according to claim 2, which further comprises third means for reducing a rotational speed of said motor when the rotational force of said motor is transmitted to said first means.

12. The arrangement according to claim 1, which further comprises: (a) third means for detecting when a vehicle in which the arrangement is installed stops and a driver opens a door of the vehicle to leave the vehicle and producing a signal indicative thereof; (b) fourth means responsive to the signal produced from said third means for actuating said steering wheel assembly to tilt toward a predetermined upper limit angular position by means of a spring force so as not to obstruct the driver from leaving the vehicle through the door.

13. The arrangement according to claim 12, which further comprises fifth means for locking said fourth means when said steering wheel assembly is tilted to the predetermined upper limit angular position.

14. The arrangement according to claim 12, wherein said first means comprises sixth means for memorizing the optimum driving position of said steering wheel and for returning said steering assembly to the originally set optimum driving position memorized by said sixth means in response to a depression force of said steering wheel assembly and which further comprises seventh means for detecting that the driver opens the door and the vehicle restarts and producing a signal indicative thereof, said sixth means being responsive to the signal derived from said seventh means.

15. The arrangement according to claim 14, wherein said first means comprises:
   (a) a crank arm having an eccentric shaft and a crankshaft;
   (b) a link assembly, one end of which is pivotally mounted on said tilt bracket through a pin of said tilt bracket and the other end of which is pivotally mounted on the eccentric shaft; and
   (d) eighth means, disposed between an output shaft of the drive source and crankshaft for transmitting the rotation of said motor to said eccentric shaft so that said eccentric shaft takes a crank motion in response to a rotational force of the drive source transmitted through the eighth means.

16. The arrangement according to claim 15, wherein said fourth means comprises:
   (a) a cam fitted into a hinge pin of said mounting bracket through which said tilt bracket is pivotally mounted on said mounting bracket;
   (b) ninth means responsive to the signal derived from said third means for actuating said cam to pivot in a predetermined direction so that said cam is contacted with and depresses said link assembly and said link assembly having an elongated hole is pivoted in the predetermined direction;
   (c) resilient means for biasing said tilt bracket to pivot in the predetermined upper limit angular position of the steering wheel assembly; and
   (d) a biasing member for biasing said link assembly to pivot in a direction opposite to the predetermined direction about the eccentric shaft.

17. The arrangement according to claim 16, wherein said fifth means comprises:
   (a) a shaft fixed to an inner wall part of said mounting bracket;
   (b) a lever pivotally supported on said shaft and having a hook portion at one end thereof;
   (c) a spring member attached on said lever for biasing said lever to pivot in the predetermined direction; and
   (d) a wire connected to said ninth means for forcing said lever to pivot in a direction opposite to the predetermined direction against the biasing force of said spring member when said ninth means actuates said cam and wherein said hook portion of said lever is engaged with the pin of said tilt bracket so that said tilt bracket is locked at a position at which said steering wheel assembly is tilted to the predetermined upper limit angular position.

18. The arrangement according to claim 17, wherein said sixth means is a link assembly.

19. The arrangement according to claim 18, wherein when an operator depresses said steering wheel assembly with the hook portion of said lever disengaged from the pin of said tilt bracket when said ninth means actuates said cam to pivot in the predetermined direction in response to the signal derived from said seventh means, the pin of said tilt bracket moves from the predetermined end to an end opposite thereto in the elongated hole of said link assembly and wherein when said cam is separated from said link assembly with said ninth means stopped, said link assembly is pivoted by means of the biasing force of said biasing member in the opposite direction so that the pin of said tilt bracket is moved and fitted into the opposite end of the elongated hole of said link assembly.

20. The arrangement according to claim 16, wherein said ninth means comprises a solenoid member and a wire, connected between said solenoid member and cam for pulling the cam toward the solenoid member by a predetermined stroke when the solenoid member is energized.

21. The arrangement according to claim 16, wherein said ninth means comprises a motor.

22. The arrangement according to claim 16, wherein the pin of said tilt bracket is inserted through the elongated hole of said link assembly and wherein when the link assembly is pivoted by means of said cam in the predetermined direction on the eccentric shaft against the biasing force of said biasing member, said link assembly moves said pin within the elongated hole to a predetermined end of said elongated hole so that said tilt bracket becomes in a pivotable state on said hinge pin.

23. The arrangement according to claim 12, wherein said third means tilts the steering wheel assembly by means of the spring force of the resilient means at a speed considerably higher than the speed at which said steering wheel assembly is tilted within the predetermined angular width.

* * * * *

UNITED STATES PATENT AND TRADEMARK OFFICE
CERTIFICATE OF CORRECTION

PATENT NO. : 4,752,085

DATED : June 21, 1988

INVENTOR(S) : Yoshimi Yamamoto

It is certified that error appears in the above-identified patent and that said Letters Patent is hereby corrected as shown below:

In Column 14, claim 3, line 17, the words "third means" was omitted after "through said", thus making this claim incomplete.

In Column 14, claim 9, line 53, the word "serration" is misspelled as "serratin".

Signed and Sealed this

Twenty-fifth Day of April, 1989

Attest:

DONALD J. QUIGG

Attesting Officer

Commissioner of Patents and Trademarks